United States Patent
Hota et al.

(10) Patent No.: US 11,423,521 B2
(45) Date of Patent: Aug. 23, 2022

(54) METHOD AND IMAGING SYSTEM FOR COMPENSATING LENS DISTORTION IN AN IMAGE

(71) Applicant: SAMSUNG ELECTRONICS CO., LTD., Suwon-si (KR)

(72) Inventors: Manjit Hota, Karnataka (IN); Puneet Pandey, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/128,999

(22) Filed: Dec. 21, 2020

(65) Prior Publication Data

US 2022/0051371 A1    Feb. 17, 2022

(30) Foreign Application Priority Data

Aug. 12, 2020  (IN) .............................. 202041034585

(51) Int. Cl.
  *G06K 9/00*    (2022.01)
  *G06T 5/00*    (2006.01)

(52) U.S. Cl.
  CPC .............. *G06T 5/006* (2013.01); *G06T 5/003* (2013.01); *G06T 2207/20081* (2013.01); *G06T 2207/20224* (2013.01)

(58) Field of Classification Search
  CPC ..................... G06T 5/006; G06T 5/003; G06T 2207/20081; G06T 2207/20224
  USPC ....................................................... 382/100
  See application file for complete search history.

(56) References Cited

U.S. PATENT DOCUMENTS

| 9,800,866 | B2 | 10/2017 | Green et al. |
| 2005/0068446 | A1 | 3/2005 | Steinberg et al. |
| 2014/0254951 | A1 | 9/2014 | Salvador et al. |
| 2019/0228506 | A1* | 7/2019 | DeWeert .................. G06T 7/13 |
| 2021/0390669 | A1* | 12/2021 | Jayasuriya .............. G06T 5/003 |

OTHER PUBLICATIONS

Andrews, Harry, and C. Patterson. "Singular value decompositions and digital image processing." IEEE Transactions on Acoustics, Speech, and Signal Processing 24.1 (1976): 26-53. (Year: 1976).*

(Continued)

*Primary Examiner* — Jonathan S Lee
(74) *Attorney, Agent, or Firm* — F. Chau & Associates, LLC

(57) ABSTRACT

An imaging system and method compensate lens distortion for an image. The system identifies lens distortion among one or more distortions, and extracts a Point Spread Function (PSF) for the lens distortion. Additionally, the system extracts a total PSF associated with total distortion in the input image and separates a PSF for the lens distortion from the total PSF. The system updates the pre-estimated kernel with the PSF of the lens distortion when a rank of the PSF matches with the predefined rank value, and one or more difference values determined between one or more singular values of the PSF and one or more singular values of the pre-estimated kernel is within a pre-defined threshold limit. Thus, quality of each output image obtained from the system may be maintained irrespective of error introduced by wear and tear on the lens of the system over a period of time.

20 Claims, 7 Drawing Sheets

(56) References Cited

OTHER PUBLICATIONS

Chang, Chih-Hsiang, and Nasser Kehtarnavaz. "Computationally efficient image deblurring using low rank image approximation and its GPU implementation." Journal of Real-Time Image Processing 12.3 (2016): 567-573. (Year: 2016).*
Devcic, Zeljko, and Sven Loncaric. "Blind restoration of space-invariant image degradations in the singular value decomposition domain." Proceedings 2001 International Conference on Image Processing (Cat. No. 01CH37205). vol. 2. IEEE, 2001. (Year: 2001).*
Ma, Tian-Hui, et al. "Image deblurring with an inaccurate blur kernel using a group-based low-rank image prior." Information Sciences 408 (2017): 213-233. (Year: 2017).*
Tofighi, Mohammad, Yuelong Li, and Vishal Monga. "Blind image deblurring using row-column sparse representations." IEEE Signal Processing Letters 25.2 (2017): 273-277. (Year: 2017).*
Wang, Wei. "An Estimation Algorithm of the Point Spread Function based on Singular Value Decomposition and Telemetry Prior Information." (2016). (Year: 2016).*
Rui Wang et al., "Blur Image Classification based on Deep Learning", IEEE, 2017.

\* cited by examiner

METHOD AND IMAGING SYSTEM FOR COMPENSATING LENS DISTORTION IN AN IMAGE

CROSS-REFERENCE

The present application claims priority under 35 U.S.C. § 119 to Indian patent application number 2020/41034585 filed on Aug. 12, 2020 in the Indian Patent Office, the entire disclosure of which is incorporated by reference.

TECHNICAL FIELD

The present disclosure is generally directed to image restoration techniques, and more particularly but not exclusively, to methods and imaging systems for compensating lens distortion in images.

DISCUSSION OF RELATED ART

In an imaging system, an imaging lens may gradually undergo wear and tear giving rise to lens, distortion effects such as defocusing, which may be created due to altered orientation of the imaging lens, related housing, or the like. The lens distortions introduced may generate inherent blurring effects in the captured images.

One approach might be for an imaging system to estimate a Point Spread Function (PSF) associated with the lens distortion for each image or frame, in an attempt to recover a distortion-free image as an output. However, estimating the PSF for every frame might not be a feasible option in many applications as it is computationally intensive. The quality of the recovered image may be affected in cases where the lens distortion is not compensated.

The related information disclosed in this section is provided as a basis for enhanced understanding of the details that follow. It shall not be taken as a suggestion, much less an acknowledgement, that such related information constitutes prior art.

SUMMARY

An exemplary embodiment method is disclosed herein for compensating lens distortion in an image. The method comprises identifying a presence of lens distortion in an image received from a camera. The lens distortion is identified among one or more distortions in the image. Upon identifying the lens distortion in the image, the method comprises extracting a Point Spread Function (PSF) corresponding to the identified lens distortion. Once the PSF is extracted, the method comprises identifying one or more singular values and a rank for the extracted PSF by performing Singular Value Decomposition (SVD) on the extracted PSF. Thereafter, the method comprises comparing the rank of the extracted PSF with a predefined rank value of a pre-estimated kernel stored in a memory of the imaging system. Further, the method comprises determining one or more difference values between the one or more singular values of the extracted PSF and one or more singular values of the pre-estimated kernel stored in the memory when the rank of the extracted PSF matches with the predefined rank value of the pre-estimated kernel stored in the memory. Thereafter, the method comprises updating the pre-estimated kernel of the imaging system with the extracted PSF to compensate the identified lens distortion when each of the determined one or more difference values is within a pre-defined threshold limit stored in the memory.

An exemplary embodiment method is disclosed herein for compensating lens distortion in an image. The method comprises extracting a total PSF in the image received from a camera. The total PSF is associated with total distortion present in the image. Upon extracting the total PSF, the method comprises separating a PSF corresponding to a lens distortion from the extracted total PSF. Once the PSF is separated, the method comprises identifying one or more singular values and a rank for the separated PSF by performing SVD on the separated PSF. Thereafter, the method comprises comparing the rank of the separated PSF with a predefined rank value of a pre-estimated kernel stored in a memory of the imaging system. Further, the method comprises determining one or more difference values between the one or more singular values of the separated PSF and one or more singular values of the pre-estimated kernel stored in the memory when the rank of the separated PSF matches with the predefined rank value of the pre-estimated kernel stored in the memory. Thereafter, the method comprises updating the pre-estimated kernel of the imaging system with the separated PSF to compensate the lens distortion when each of the determined one or more difference values is within a pre-defined threshold limit stored in the memory.

An exemplary embodiment imaging system is disclosed herein for compensating lens distortion in an image. The imaging system comprises a processor and a memory communicatively coupled to the processor. The memory stores the processor-executable instructions, which, on execution, cause the processor to identify a presence of lens distortion in the image received from a camera. The processor identifies the lens distortion among one or more distortions in the image. Further, the processor extracts a PSF corresponding to the identified lens distortion. Upon extracting the PSF, the processor identifies one or more singular values and a rank for the extracted PSF by performing SVD on the extracted PSF. Thereafter, the processor compares the rank of the extracted PSF with a predefined rank value of a pre-estimated kernel stored in a memory of the imaging system. Further, the processor determines one or more difference values between the one or more singular values of the extracted PSF and one or more singular values of the pre-estimated kernel stored in the memory when the rank of the extracted PSF matches with the predefined rank value of the pre-estimated kernel stored in the memory. Thereafter, the processor updates the pre-estimated kernel of the imaging system with the extracted PSF to compensate the lens distortion when each of the determined one or more difference values is within a pre-defined threshold limit stored in the memory.

An exemplary embodiment imaging system is disclosed herein for compensating lens distortion in an image. The imaging system comprises a processor and a memory communicatively coupled to the processor. The memory stores the processor-executable instructions, which, on execution, cause the processor to extract a total PSF associated with total distortion present in an image received from a camera. After extracting the total PSF, the processor separates a PSF corresponding to a lens distortion from the extracted total PSF of the input image. Upon separating the PSF, the processor identifies one or more singular values and a rank for the separated PSF by performing SVD on the separated PSF. Thereafter, the processor compares the rank of the separated PSF with a predefined rank value of a pre-estimated kernel stored in a memory of the imaging system. Further, the processor determines one or more difference values between the one or more singular values of the separated PSF and one or more singular values of the pre-estimated kernel stored in the memory when the rank of the separated PSF matches with the predefined rank value of the pre-estimated kernel stored in the memory. Thereafter, the processor updates a pre-estimated kernel of the imaging system with the separated PSF to compensate the lens distortion when each of the determined one or more difference values is within a pre-defined threshold limit stored in the memory.

An exemplary embodiment image de-blurring apparatus is disclosed herein, comprising: a camera having a lens; a processor; a memory communicatively coupled between the camera and the processor, including a pre-estimated kernel register, a pre-defined rank value register, and a pre-defined threshold limit register; a de-blurring module communicatively coupled to the camera and the pre-estimated kernel register; a PSF estimation module communicatively coupled to the camera; and a PSF updating module communicatively coupled between the PSF estimation module and the pre-estimated kernel register, wherein the pre-estimated kernel register is configured to maintain a separated PSF corresponding to an updated image de-blurring compensation factor responsive to the lens.

The foregoing summary is illustrative only and shall not be taken as limiting. In addition to the illustrative embodiments described above, further embodiments shall become apparent by referencing the drawings and the following detailed description.

BRIEF DESCRIPTION OF THE DRAWINGS

The accompanying drawings, which are incorporated in and constitute a part of this disclosure, illustrate exemplary embodiments and, together with the description, explain details of these exemplary embodiments. In the figures, the left-most digit(s) of a reference number may identify the figure in which the reference number first appears. The same numbers may be used throughout the figures to reference like features and components. Some descriptions of a system and/or method in accordance with embodiments of the present subject matter are now provided, by way of example, and regarding the accompanying figures, in which.

Figure 1A:
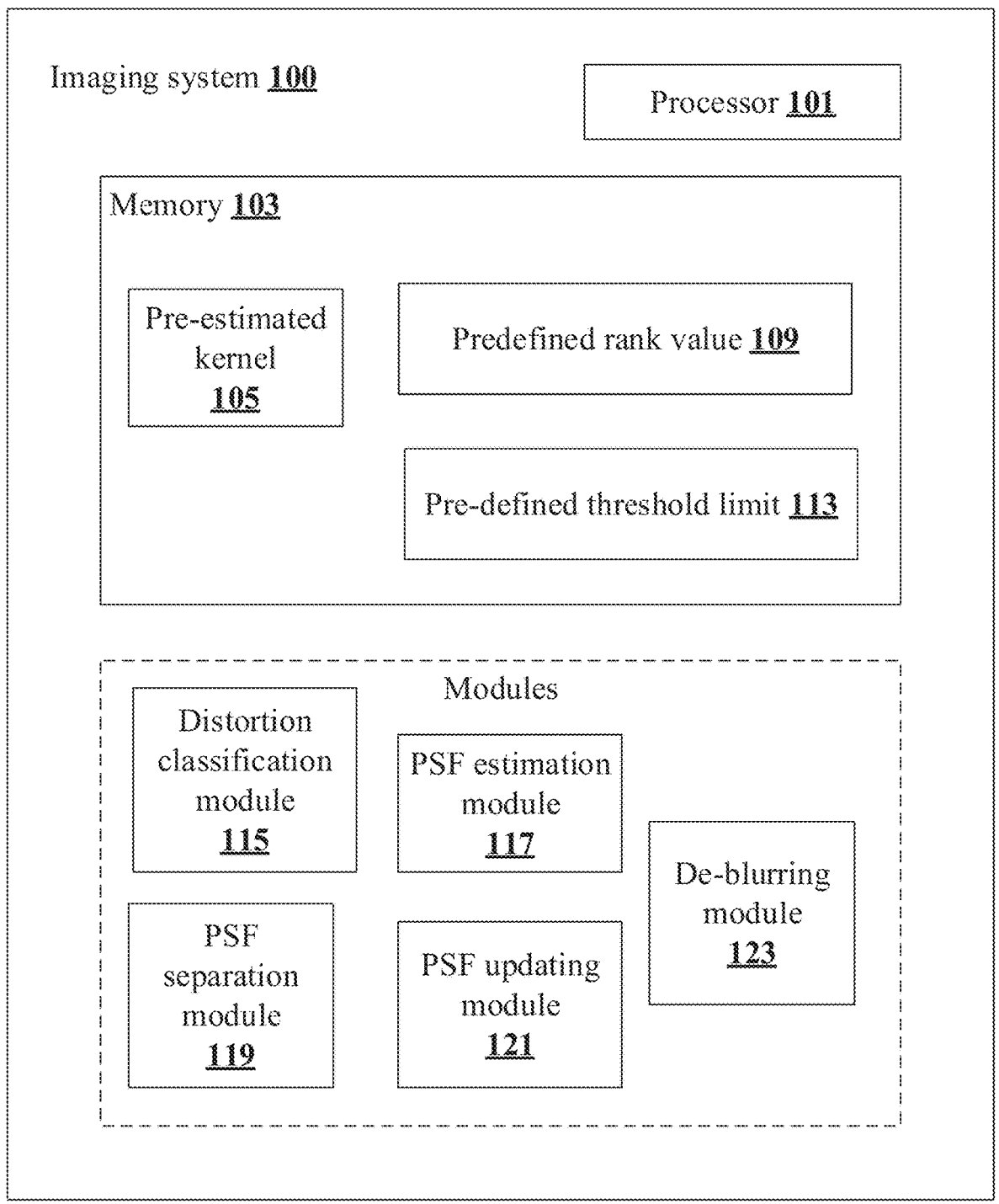
FIG. 1A is a block diagram of an imaging system for compensating lens distortion in an image in accordance with an embodiment of the present disclosure.

It shall be appreciated by those skilled in the art that the block diagrams herein represent conceptual views of illustrative systems embodying examples of the present subject matter. Similarly, it shall be appreciated that the flowchart diagrams, flow diagrams, state transition diagrams, pseudo code, or the like represent various processes which may be substantially represented in a tangible computer-readable medium and executed by a computer system and/or processor, whether or not such computer system and/or processor is explicitly shown.

DETAILED DESCRIPTION

In the present disclosure, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof may be shown by way of example in the drawings and described in detail below. It shall be understood, however, that it is not intended to limit the disclosure to the specific forms disclosed, but on the contrary, the present disclosure is to cover all modifications, equivalents, and alternatives falling within the scope of this disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without specific constraints, preclude the existence of other elements or additional elements in the embodiment.

The present disclosure relates to methods and imaging systems for compensating lens distortion in input images or frames. An impulse response of the imaging system to a point source or point object is represented by a Point Spread Function (PSF). In other words, the PSF describes what happens to each point source of light after it passes through the imaging system. The PSF provides criteria concerning image performance directly related to the image formation of the lens system. Hence an accurate approximation of the PSF is used for performing convolution with an input image to reconstruct an output image. Embodiments of the present disclosure may avoid unnecessarily repeated estimation of the PSF associated with the lens distortion by providing a mechanism to update a pre-estimated kernel of the imaging system with a PSF after verifying its quality.

In the present disclosure, the imaging system may follow two pipelines to update a pre-estimated kernel of the imaging system with a Point Spread Function (PSF) corresponding to a lens distortion in the input image received from a camera. In one of the pipelines, the imaging system may identify a presence of lens distortion among one or more distortions in the input image by a deep learning-based classification technique. Upon identifying the lens distortion, the imaging system may extract a Point Spread Function (PSF) ($K_{S1}$) corresponding to the identified lens distortion using a blind deconvolution technique. Once an extracted PSF ($K_{S1}$) is obtained, the imaging system may identify one or more singular values and a rank for the extracted PSF ($K_{S1}$) by performing Singular Value Decomposition (SVD) on the extracted PSF ($K_{S1}$). Thereafter, the imaging system may compare the rank of the extracted PSF ($K_{S1}$) with a predefined rank value of a pre-estimated kernel stored in a memory of the imaging system. The pre-estimated kernel is used for blurring, sharpening, embossing, edge detection, and the like to reconstruct an output image, which is accomplished by doing a convolution between a kernel and an image. When the rank of the extracted PSF ($K_{S1}$) matches with the predefined rank value of the pre-estimated kernel stored in the memory, the imaging system may determine one or more difference values between the one or more singular values of the extracted PSF ($K_{S1}$) and one or more singular values of the pre-estimated kernel stored in the memory. Thereafter, the imaging system may update the pre-estimated kernel of the imaging system with the extracted PSF ($K_{S1}$) to compensate the identified lens distortion when each of the determined one or more difference values is within a pre-defined threshold limit stored in the memory.

In other pipeline, the imaging system may extract a total Point Spread Function (PSF) associated with total distortion present in the input image using a blind deconvolution technique. Thereafter, the imaging system may separate a PSF ($K_{S2}$) corresponding to a lens distortion from the extracted total PSF. Once the PSF ($K_{S2}$) is separated, the imaging system may identify one or more singular values and a rank for the separated PSF ($K_{S2}$) by performing SVD on the separated PSF ($K_{S2}$). Thereafter, the imaging system may compare the rank of the separated PSF ($K_{S2}$) with a predefined rank value of a pre-estimated kernel stored in a memory of the imaging system. When the rank of the separated PSF ($K_{S2}$) matches with the predefined rank value of the pre-estimated kernel stored in the memory, the imaging system may determine one or more difference values between the one or more singular values of the separated PSF ($K_{S2}$) and one or more singular values of the pre-estimated kernel stored in the memory. Thereafter, the imaging system may update the pre-estimated kernel of the imaging system with the separated PSF ($K_{S2}$) to compensate the lens distortion when each of the determined one or more difference values is within a pre-defined threshold limit stored in the memory. In this manner, the present disclosure provides a method and imaging system for compensating lens distortion in input images thereby maintaining quality of output images obtained from the imaging system, irrespective of error introduced by wear and tear of the lens of the imaging system over a period of time.

FIG. 1A shows an imaging system for compensating lens distortion in an image in accordance with an embodiment of the present disclosure.

As shown in FIG. 1A, the imaging system 100 may include a processor 101 and a memory 103 communicatively coupled to the processor 101. The memory 103 may store the processor-executable instructions, on execution of which the processor 101 may perform specific actions for compensating lens distortion in an input image received from a camera. The memory 103 may include a pre-estimated kernel 105. Further, the memory 103 may store a predefined rank value 109 and a pre-defined threshold limit 113 which may be utilized for updating the pre-estimated kernel 105. In some embodiments, the data stored in the memory 103 may be processed by modules of the imaging system 100. The modules may be stored within the memory 103. In an example, the modules are communicatively coupled to the processor 101 configured in the imaging system 100, and may also be present outside the memory 103 as shown in FIG. 1A and implemented as hardware. As used herein, the term modules may refer to an Application Specific Integrated Circuit (ASIC), an electronic circuit, a processor (shared, dedicated, or group) and memory that execute one or more software and/or firmware programs, a combinational logic circuit, and/or other suitable components that provide the described functionality.

In an embodiment, the modules may include, for example, a distortion classification module 115, a PSF estimation module 117, a PSF separation module 119, a PSF updating module 121 and/or a de-blurring module 123. In an embodiment, the distortion classification module 115 may be communicatively coupled with the processor 101 of the imaging system 100 for identifying the presence of a lens distortion in the image among one or more distortions in the input image received from a camera.

Figure 1B:
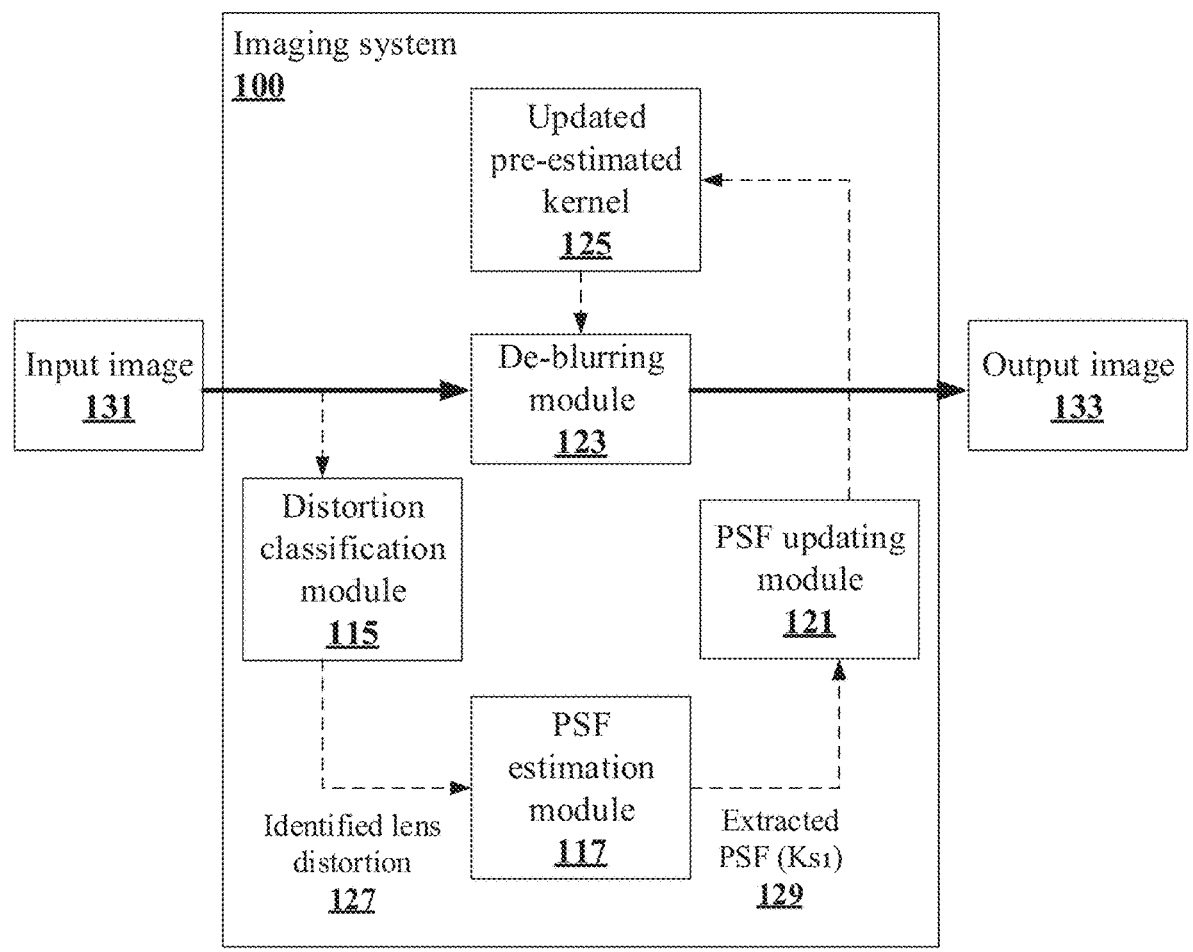
FIG. 1B is a block diagram that shows interconnection between system components of an imaging system for compensating lens distortion in an image by identifying presence of the lens distortion in the image among one or more distortions in the image in accordance with an embodiment of the present disclosure.

Referring now to FIG. 1A and FIG. 1B, the PSF estimation module 117 may be communicatively coupled with the processor 101 for extracting a PSF ($K_{S1}$) 129 corresponding to the identified lens distortion 127 utilizing a blind deconvolution technique, for example. The PSF updating module 121 may be communicatively coupled with the processor 101 for updating the pre-estimated kernel 105 of the memory 103 with the extracted PSF ($K_{S1}$) 129 utilizing the predefined rank value 109 and the pre-defined threshold limit 113 stored in the memory 103. The de-blurring module 123 may be communicatively coupled with the processor 101 for performing deconvolution on the input image received from the camera with the updated pre-estimated kernel 125.

Figure 1C:
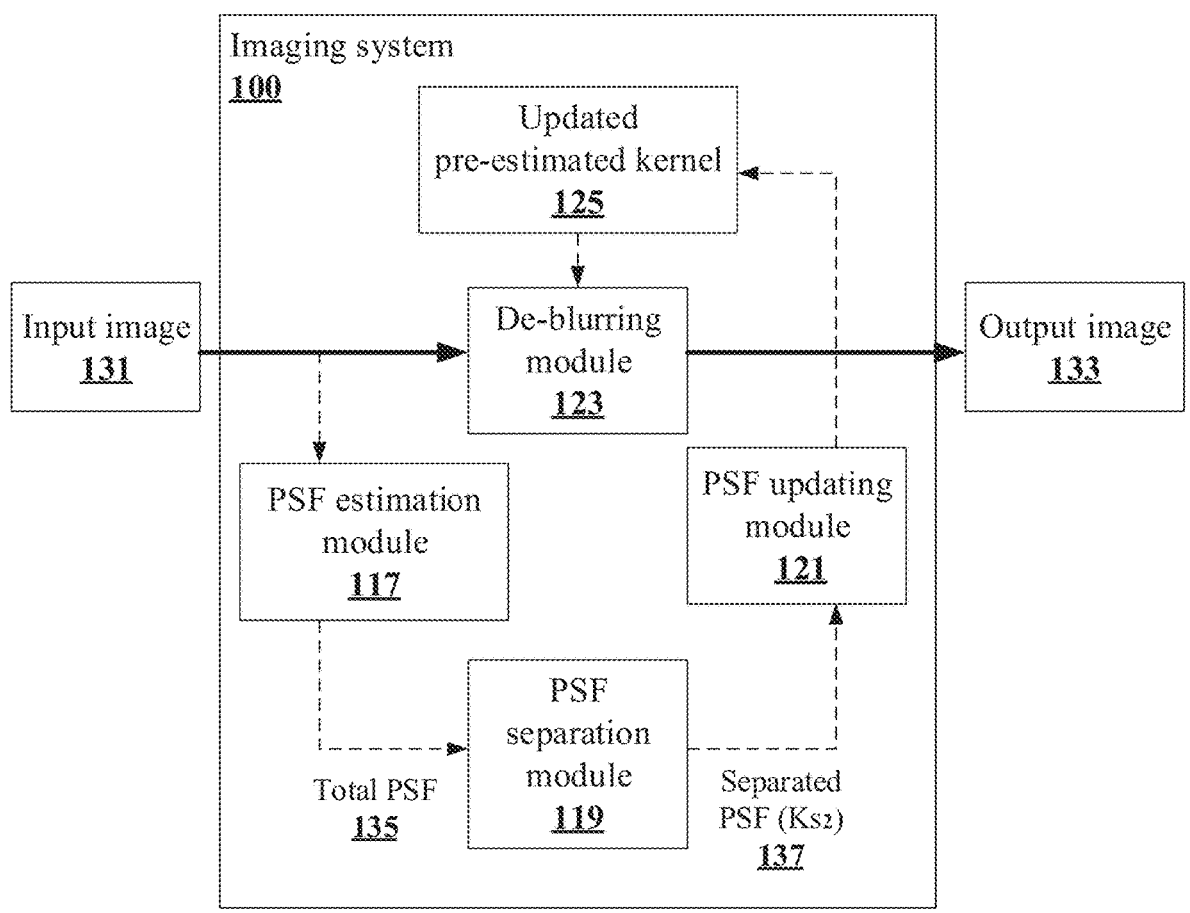
FIG. 1C is a block diagram that shows exemplary interconnections between system components of an imaging system for compensating lens distortion in an image by extracting a total Point Spread Function (PSF) associated with total distortion present in the image in accordance with an embodiment of the present disclosure.

Referring now to FIG. 1A and FIG. 1C, in an embodiment, the PSF estimation module 117, communicatively coupled with the processor 101, may extract a total Point Spread Function (PSF) 135 associated with total distortion present in the image received from the camera utilizing a blind deconvolution technique. The PSF separation module 119 may be communicatively coupled with the processor 101 for separating a PSF ($K_{S2}$) 137 corresponding to a lens distortion from the extracted total PSF 135. The PSF updating module 121, communicatively coupled with the processor 101, may update the pre-estimated kernel 105 of the memory 103 with the extracted PSF ($K_{S1}$) 129 utilizing the predefined rank value 109 and the pre-defined threshold limit 113 stored in the memory 103. The de-blurring module 123 may perform deconvolution on the input image received from the camera with the updated pre-estimated kernel 125.

FIG. 1B shows an exemplary interconnection between system components of an imaging system for compensating lens distortion in an image by identifying the presence of a lens distortion in the image among one or more distortions in the image in accordance with an embodiment of the present disclosure.

Figure 2:
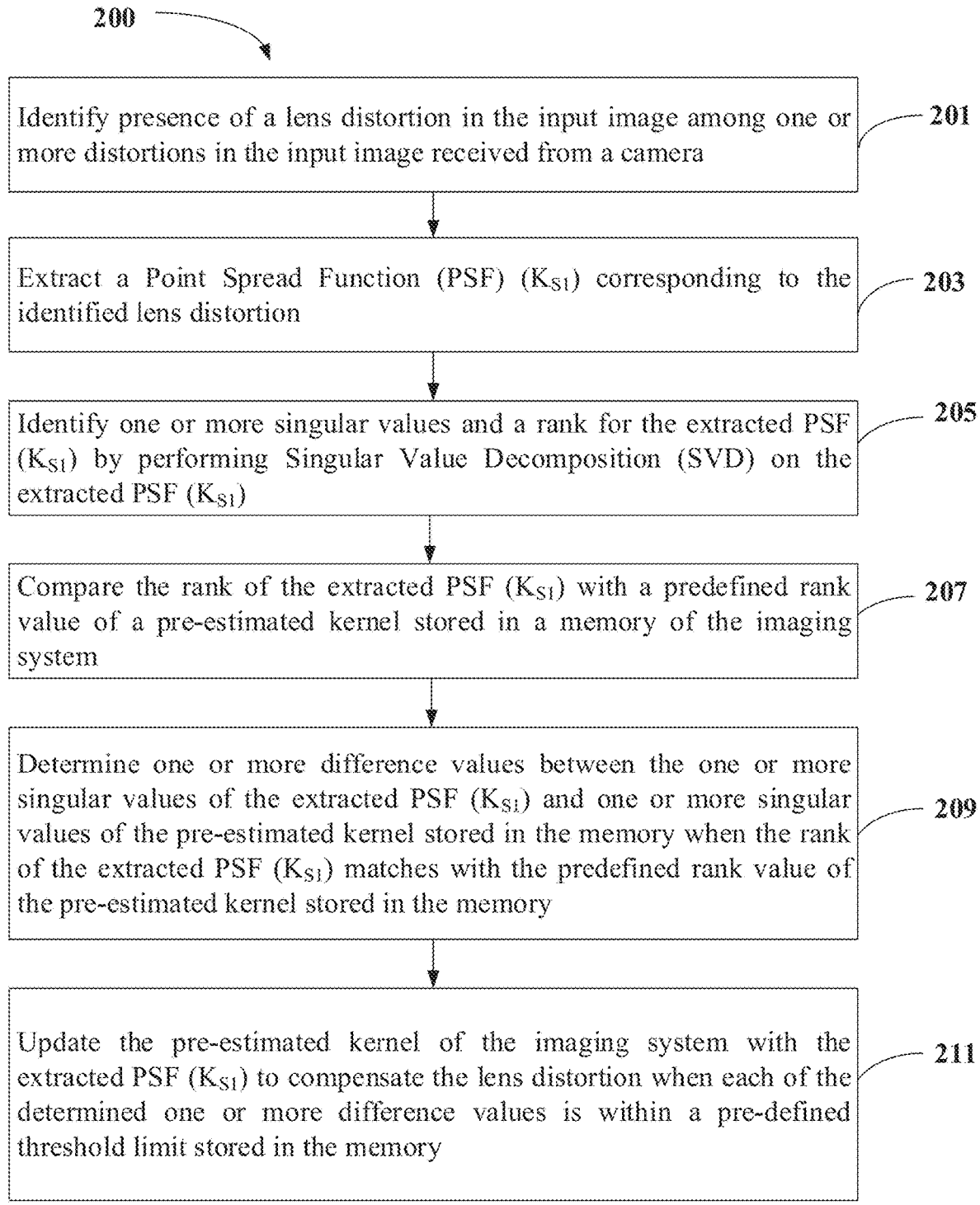
FIG. 2 is a flowchart diagram illustrating a method for compensating lens distortion in an image by identifying a presence of lens distortion in the image among one or more distortions in the image in accordance with an embodiment of the present disclosure.

As shown in FIG. 1B, the imaging system 100 may receive an input image 131 from a camera. The input image 131 may be fed to a distortion classification module 115 of the imaging system 100 to identify the presence of a lens distortion in the image, among one or more distortions. In order to identify the presence of the lens distortion, the distortion classification module 115 may classify one or more distortions into atmospheric distortion, motion distortion, and lens distortion by using a deep learning-based classification technique. The identified lens distortion 127 may be fed to the PSF estimation module 117, which may extract a PSF ($K_{S1}$) 129 corresponding to the identified lens distortion 127 utilizing a blind deconvolution technique. The extracted PSF ($K_{S1}$) 129 may be fed to the PSF updating module 121 for updating a pre-estimated kernel 105 of a memory 103 of the imaging system 100 with the extracted PSF ($K_{S1}$) 129. But prior to updating, the processor 101 may evaluate the quality of the extracted PSF ($K_{S1}$) 129. In order to decide whether the extracted PSF ($K_{S1}$) 129 is acceptable for updating or not, the processor 101 may identify one or more singular values and a rank of the extracted PSF ($K_{S1}$) 129 by performing Singular Value Decomposition (SVD) on the extracted PSF ($K_{S1}$) 129 as illustrated in FIG. 2, infra.

Each of the one or more singular values of the extracted PSF ($K_{S1}$) 129 may be associated with a spatial distribution of the blurring component. Upon identifying the one or more singular values and the rank, the processor 101 may compare the rank of the extracted PSF ($K_{S1}$) 129 with a predefined rank value 109 of a pre-estimated kernel 105 stored in a memory 103 of the imaging system 100 to verify whether the identified rank of the extracted PSF ($K_{S1}$) 129 matches with the predefined rank value 109 or not. If the condition is satisfied, the processor 101 may determine one or more difference values between the one or more singular values of the extracted PSF ($K_{S1}$) 129 and one or more singular values of the pre-estimated kernel stored in the memory 103 to verify whether or not each of the determined one or more difference values is within a pre-defined threshold limit 113 stored in the memory 103. If the condition for the singular value check is satisfied, the PSF updating module 121 may accept the extracted PSF ($K_{S1}$) 129 for updating the pre-estimated kernel 105 of the memory 103, or otherwise it may discard the extracted PSF ($K_{S1}$) 129. The selected extracted PSF ($K_{S1}$) 129 for update may be stored in the pre-estimated kernel 105 to replace the old PSF value corresponding to the previous lens distortion. In this manner, the pre-estimated kernel 105 may be updated with the appropriate extracted PSF ($K_{S1}$) 129 to compensate the lens distortion present in the input image 131. Thereafter, a de-blurring module 123 may perform deconvolution on the input image 131 utilizing the updated pre-estimated kernel 125 to obtain an output image 133, thereby compensating the lens distortion.

FIG. 1C shows interconnection between system components of an imaging system for compensating lens distortion in an image by extracting a total Point Spread Function (PSF) associated with total distortion present in the input image in accordance with an embodiment of the present disclosure.

Figure 3A:
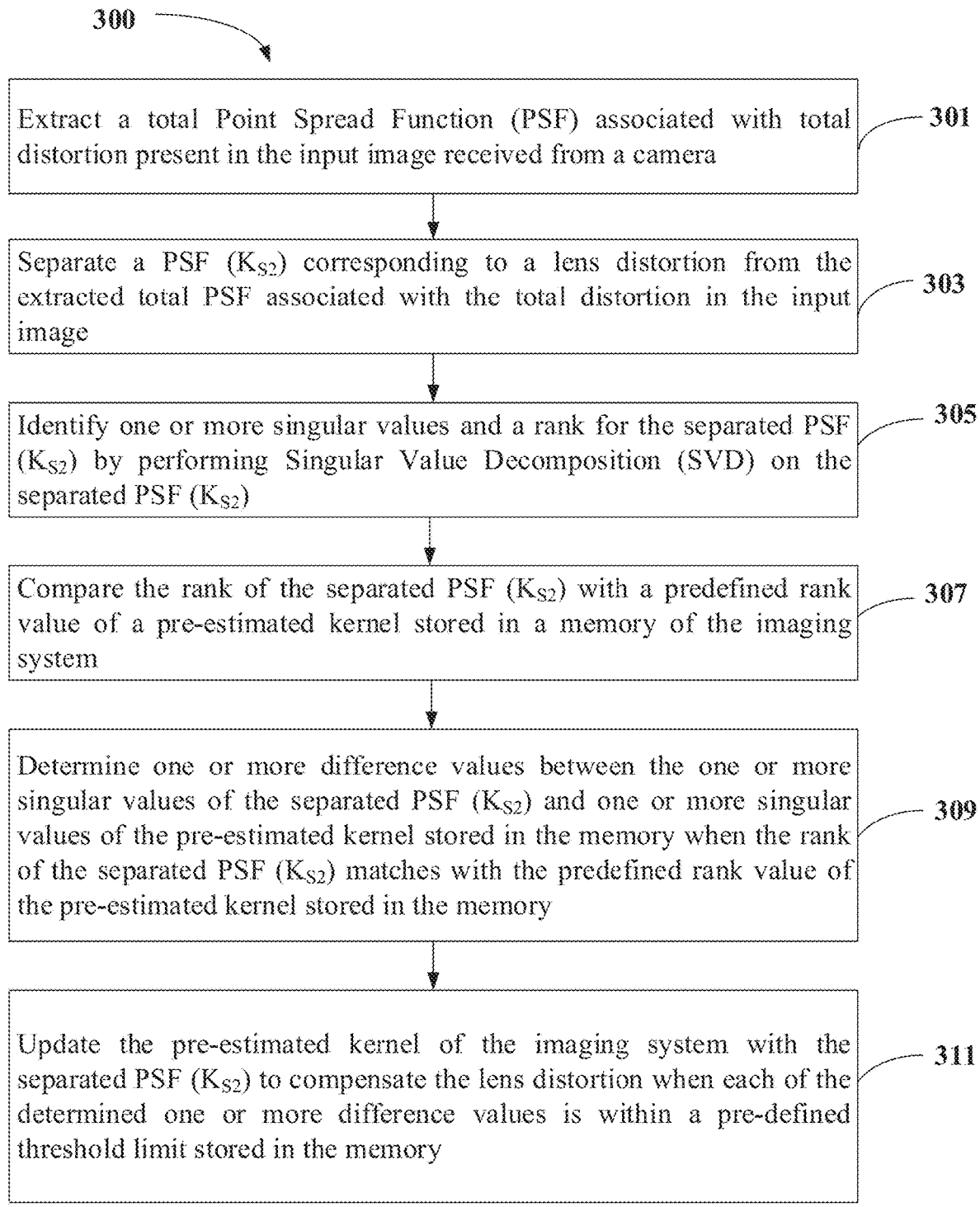
FIG. 3A is a flowchart diagram illustrating a method for compensating lens distortion in an image by extracting a total Point Spread Function (PSF) associated with total distortion present in the image in accordance with an embodiment of the present disclosure.

As shown in FIG. 1C, the imaging system 100 may receive an input image 131 from a camera. The input image 131 may be fed to the PSF estimation module 117 to extract a total Point Spread Function (PSF) 135 associated with total distortion. The total PSF 135 may be a sum of the PSF associated with atmospheric distortion, the PSF associated with motion distortion, and the PSF associated with lens distortion. The extracted total PSF 135 may be fed to the PSF separation module 119 for separating a PSF ($K_{S2}$) 137 corresponding to the lens distortion from the extracted total PSF 135. The PSF separation module 119 may initialize the PSF ($K_{S2}$) 137 to the pre-estimated kernel 105. Thereafter, the PSF separation module 119 may determine an approximate kernel ($K_{delta}$) by identifying difference between the total PSF 135 and the PSF ($K_{S2}$) 137. Further, the PSF separation module 119 may minimize each of the approximate kernel ($K_{delta}$) and the PSF ($K_{S2}$) 137 iteratively until a difference between the approximate kernel ($K_{delta}$) and the PSF ($K_{S2}$) 137 is less than or equal to a predefined value associated with a convergence error. The separated PSF ($K_{S2}$) 137 may be fed to the PSF updating module 121 for updating a pre-estimated kernel 105 of a memory 103 of the imaging system 100 with the separated PSF ($K_{S2}$) 137. Prior to updating, the processor 101 may evaluate quality of the separated PSF ($K_{S2}$) 137. In order to decide whether the separated PSF ($K_{S2}$) 137 is acceptable for updating or not, at first the processor 101 may identify one or more singular values and a rank of the separated PSF ($K_{S2}$) 137 by performing Singular Value Decomposition (SVD) on the separated PSF ($K_{S2}$) 137 as illustrated in FIG. 3A, infra.

Thereafter, the processor 101 may compare the rank of the separated PSF ($K_{S2}$) 137 with a predefined rank value 109 of a pre-estimated kernel stored in a memory 103 of the imaging system 100 to verify whether or not the identified rank of the separated PSF ($K_{S2}$) 137 matches with the predefined rank value 109. If the condition is satisfied, then the processor 101 may determine one or more difference values between the one or more singular values of the separated PSF ($K_{S2}$) 137 and one or more singular values of the pre-estimated kernel stored in the memory 103 to verify whether or not each of the determined one or more difference values is within a pre-defined threshold limit 113 stored in the memory 103. If the condition for singular value check is satisfied, the PSF updating module 121 may accept the separated PSF ($K_{S2}$) 137 for updating the pre-estimated kernel 105 of the memory 103, or otherwise it may discard the separated PSF ($K_{S2}$) 137. The selected separated PSF ($K_{S2}$) 137 may be stored in the pre-estimated kernel 105 to replace the old PSF value corresponding to the lens distortion. In this manner, the pre-estimated kernel 105 may be updated with the appropriate separated PSF ($K_{S2}$) 137 to compensate the lens distortion present in the input image 131. Thereafter, the de-blurring module 123 may perform deconvolution on the input image 131 utilizing the updated pre-estimated kernel 125 to obtain an output image 133, thereby compensating the lens distortion.

FIG. 2 shows a flowchart illustrating a method for compensating lens distortion in an image by identifying the presence of a lens distortion in the image among one or more distortions in the image in accordance with an embodiment of the present disclosure.

As illustrated in FIG. 2, the method 200 includes one or more function blocks for compensating lens distortion in an input image by identifying the presence of a lens distortion in the image. The method 200 may be described in the general context of computer executable instructions, although it may also be implemented as a circuit. Generally, computer executable instructions can include routines, programs, objects, components, data structures, procedures, modules, and functions, which perform specific functions or implement specific abstract data types.

The order in which the method 200 is described is not intended to be construed as a limitation, and any number of the described method blocks can be combined in any order to implement the method, and need not be entirely sequential. Additionally, individual blocks may be deleted from the method without departing from the spirit and scope of the subject matter described herein. Furthermore, the method can be implemented in any suitable hardware, software, firmware, or combination thereof.

At block 201, the method may include identifying, such as by an imaging system 100, the presence of a lens distortion in an image. The imaging system 100 may receive the image having one or more distortions from a camera. Further, the imaging system 100 may classify the one or more distortions of the received image into an atmospheric distortion, a motion distortion, and a lens distortion utilizing a deep learning-based technique. Upon classifying, the imaging system 100 may detect the lens distortion for extracting a corresponding point spread function to compensate the lens distortion. However, if the imaging system 100 does not identify any presence of lens distortion among one or more distortions in the image, then the imaging system 100 need not perform steps associated with extracting a Point Spread Function (PSF) ($K_{S1}$) 129 for the lens distortion and/or updating a pre-estimated kernel 105.

At block 203, the method may include extracting, by the imaging system 100, a Point Spread Function (PSF) ($K_{S1}$) 129 corresponding to the identified lens distortion 127. The imaging system 100 may extract the PSF ($K_{S1}$) 129 by a blind deconvolution technique when the imaging system 100 identifies the lens distortion 127.

At block 205, the method may include identifying, by the imaging system 100, one or more singular values and a rank for the extracted PSF ($K_{S1}$) 129 by performing Singular Value Decomposition (SVD) on the extracted PSF ($K_{S1}$) 129. The rank of the extracted PSF ($K_{S1}$) 129 may be identified by determining one or more non-zero positive singular values of the extracted PSF ($K_{S1}$) 129 from the identified one or more singular values. The total number of determined one or more non-zero positive singular values may decide the rank of the extracted PSF ($K_{S1}$) 129. The identification of the one or more singular values and the rank for the extracted PSF ($K_{S1}$) 129 may be used for quality evaluation of the extracted PSF ($K_{S1}$) 129 with respect to a pre-estimated kernel 105 stored in the memory 103 of the imaging system 100.

At block 207, the method may include comparing, by the imaging system 100, the rank of the extracted PSF (KO 129 with a predefined rank value 109 of a pre-estimated kernel stored in a memory 103 of the imaging system 100. The identified rank of the extracted PSF ($K_{S1}$) 129 may be compared to verify whether or not it matches with the predefined rank value 109 stored in the memory 103.

At block 209, the method may include determining, by the imaging system 100, one or more difference values between the one or more singular values of the extracted PSF ($K_{S1}$) 129 and one or more singular values of the pre-estimated kernel stored in the memory 103 when the rank of the extracted PSF ($K_{S1}$) 129 matches with the predefined rank value 109 of the pre-estimated kernel 105 stored in the memory 103. For example, $\sigma_0, \sigma_1, \sigma_2, \ldots \sigma_i$ may be the one or more singular values of the extracted PSF ($K_{S1}$) 129 and "m", a non-negative integer, may be the rank of the extracted PSF ($K_{S1}$) 129. The one or more singular values of the pre-estimated kernel 105 may be $\sigma_{lab0}, \sigma_{lab1}, \sigma_{lab2}, \ldots \sigma_{labi}$ and the rank of the pre-estimated kernel 105 may be "n", a non-negative integer. When rank "m" of the extracted PSF ($K_{S1}$) 129 substantially equals rank "n" of the pre-estimated kernel 105, the one or more difference values may be evaluated as follows, $$\Delta_{\sigma i} = \text{mod}(\sigma_i - \sigma_{labi}) \quad \text{(EQN. 1)}$$

In EQN. 1, $\Delta_{\sigma i}$ may represent the difference between an $i^{th}$ singular value of the extracted PSF ($K_{S1}$) 129 and the corresponding $i^{th}$ singular value of the pre-estimated kernel 105.

However, if the rank of the extracted PSF ($K_{S1}$) 129 does not match with the predefined rank value 109 stored in the memory 103, the imaging system 100 need not determine the one or more difference values between the one or more singular values of the extracted PSF ($K_{S1}$) 129 and the one or more singular values of the pre-estimated kernel stored in the memory 103. If the rank of the extracted PSF ($K_{S1}$) 129 does not match with the predefined rank value 109, the extracted PSF ($K_{S1}$) 129 may be discarded and need not be considered for updating the pre-estimated kernel 105 of the imaging system 100.

At block 211, the method may include updating, such as by the imaging system 100, the pre-estimated kernel 105 of the imaging system 100 with the extracted PSF ($K_{S1}$) 129 to compensate the identified lens distortion when each of the determined one or more difference values is within a pre-defined threshold limit 113 stored in the memory 103. Here, two tunable threshold parameters of the pre-defined threshold limit 113 may be preset to verify whether or not each of the determined one or more difference values lies within the pre-defined threshold limit 113. For example, $Th_{min}$ may be a lower tunable threshold parameter and $Th_{max}$ may be an upper tunable threshold parameter. For quality evaluation of the extracted PSF ($K_{S1}$) 129, the imaging system 100 may verify the following condition;

$$Th_{min} \leq \Delta_{\sigma i} \leq Th_{max} \quad \text{(EQN. 2)}$$

In EQN. 2, when each of the determined one or more $\Delta_{\sigma i}$ is within $Th_{min}$ and $Th_{max}$, the pre-estimated kernel 105 of the imaging system 100 may be updated with the extracted PSF ($K_{S1}$) 129. However, if the above condition is not satisfied, the imaging system 100 may discard the extracted PSF ($K_{S1}$) 129 for updating the pre-estimated kernel 105.

FIG. 3A shows a method for compensating lens distortion in an image by extracting a total Point Spread Function (PSF) associated with a total distortion present in the image in accordance with an embodiment of the present disclosure.

As illustrated in FIG. 3A, the method 300 includes one or more blocks for compensating lens distortion in an image by extracting a total Point Spread Function (PSF) associated with the total distortion present in the image. The method 300 may be described in the general context of computer executable instructions, but may also be implemented as a circuit. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the method without departing from the spirit and scope of the subject matter described herein. Furthermore, the method can be implemented in any suitable hardware, software, firmware, or combination thereof.

At block 301, the method may include extracting, such as by an imaging system 100, a total Point Spread Function (PSF) associated with the total distortion present in an image received from a camera. The imaging system 100 may extract the total PSF 135 using a blind deconvolution technique, for example. The total PSF 135 associated with the total distortion may be sum of the PSF associated with atmospheric distortion, the PSF associated with motion distortion, and the PSF associated with lens distortion.

At block 303, the method may include separating, such as by the imaging system 100, a PSF ($K_{S2}$) 137 corresponding to a lens distortion from the extracted total PSF 135 associated with the total distortion in the Input image 131. The imaging system 100 may separate the PSF ($K_{S2}$) 137 by iteratively minimizing an approximate kernel ($\tilde{K}_{delta}$) and the PSF ($K_{S2}$) 137 in an alternative manner.

At block 305, the method may include identifying, such as by the imaging system 100, one or more singular values and a rank for the separated PSF ($K_{S2}$) 137 by performing Singular Value Decomposition (SVD) on the separated PSF ($K_{S2}$) 137. The rank of the separated PSF ($K_{S2}$) 137 may be identified by determining one or more non-zero positive singular values of the separated PSF ($K_{S2}$) 137 from the identified one or more singular values. The total number of determined one or more non-zero positive singular values may decide the rank of the separated PSF ($K_{S2}$) 137. The identification of the one or more singular values and the rank for the separated PSF ($K_{S2}$) 137 may be used for quality evaluation of the separated PSF ($K_{S2}$) 137 with respect to a pre-estimated kernel 105 stored in the memory 103 of the imaging system 100.

At block 307, the method may include comparing, such as by the imaging system 100, the rank of the separated PSF ($K_{S2}$) 137 with a predefined rank value 109 of a pre-estimated kernel 105 stored in a memory 103 of the imaging system 100. The identified rank of the separated PSF ($K_{S2}$) 137 may be compared to verify whether or not it matches with the predefined rank value 109 stored in the memory 103.

At block 309, the method may include determining, such as by the imaging system 100, one or more difference values between the one or more singular values of the separated PSF ($K_{S2}$) 137 and one or more singular values of the pre-estimated kernel stored in the memory 103 when the rank of the separated PSF ($K_{S2}$) 137 matches the predefined rank value 109 of the pre-estimated kernel 105 stored in the memory 103. For example, $\sigma_0, \sigma_1, \sigma_2, \ldots \sigma_i$ may be the one or more singular values of the separated PSF ($K_{S2}$) 137, and "p" may be the rank of the separated PSF ($K_{S2}$) 137. The one or more singular values of the pre-estimated kernel 105 may be $\sigma_{lab0}, \sigma_{lab1}, \sigma_{lab2}, \ldots \sigma_{labi}$ and the rank of the pre-estimated kernel 105 may be "n", a non-negative integer. When rank "p" of the separated PSF ($K_{S2}$) 137 substantially equals rank "n" of the pre-estimated kernel 105, the one or more difference values may be evaluated as follows, $$\Delta_{oi} = \mathrm{mod}(\sigma_i - \sigma_{labi}) \tag{EQN. 3}$$

In EQN. 3, $\Delta_{oi}$ may represent the difference between an $i^{th}$ singular value of the separated PSF ($K_{S2}$) 137 and the corresponding $i^{th}$ singular value of the pre-estimated kernel 105.

However, if the rank of the separated PSF ($K_{S2}$) 137 does not match the predefined rank value 109 stored in the memory 103, the imaging system 100 need not determine the one or more difference values between the one or more singular values of the separated PSF ($K_{S2}$) 137 and the one or more singular values of the pre-estimated kernel stored in the memory 103, respectively. If the rank of the separated PSF ($K_{S2}$) 137 does not match the predefined rank value 109, the separated PSF ($K_{S2}$) 137 may be discarded and need not be considered for updating the pre-estimated kernel 105 of the imaging system 100.

At block 311, the method may include updating, such as by the imaging system 100, the pre-estimated kernel 105 of the imaging system 100 with the separated PSF ($K_{S2}$) 137 to compensate the identified lens distortion when each of the determined one or more difference values is within a pre-defined threshold limit 113 stored in the memory 103. Here, two tunable threshold parameters of the pre-defined threshold limit 113 may be preset to verify whether or not each of the determined one or more difference values lies within the pre-defined threshold limit 113. For example, $Th_{min}$ may be a lower tunable threshold parameter and $Th_{max}$ may be an upper tunable threshold parameter. For quality evaluation of the separated PSF ($K_{S2}$) 137, the imaging system 100 may verify the following condition;

$$Th_{min} \leq \Delta_{oi} \leq Th_{max} \tag{EQN. 4}$$

In EQN. 4, when each of the determined one or more $\Delta_{oi}$ is within $Th_{min}$ and $Th_{max}$, the pre-estimated kernel 105 of the imaging system 100 may be updated with the separated PSF ($K_{S2}$) 137. However, if the above condition is not satisfied, the imaging system 100 may discard the separated PSF ($K_{S2}$) 137 for updating the pre-estimated kernel 105.

Figure 3B:
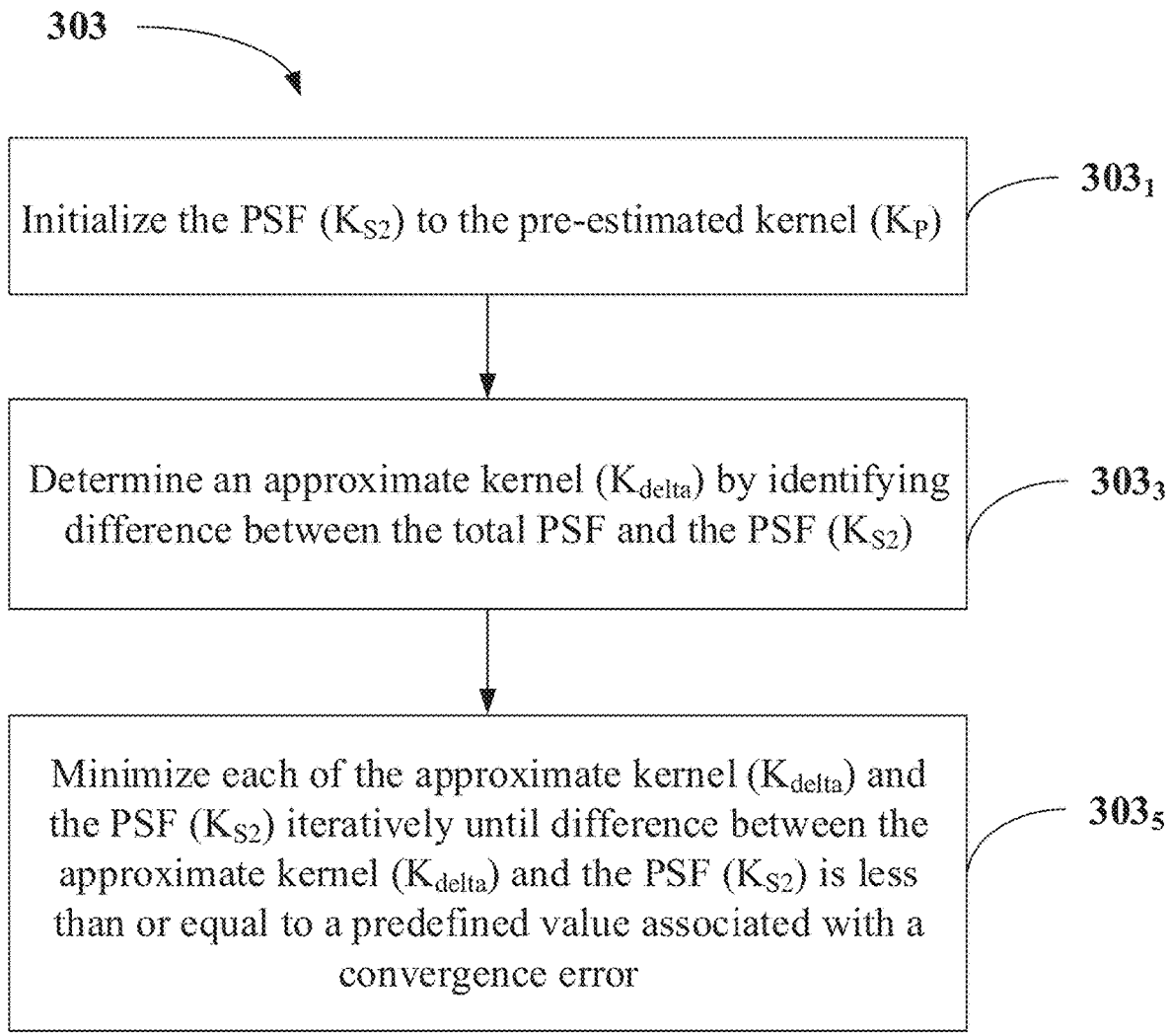
FIG. 3B is a flowchart diagram illustrating method for separating a PSF ($Ks_2$) corresponding to a lens distortion from an extracted total PSF associated with total distortion in the input image in accordance with some embodiments of the present disclosure.

FIG. 3B shows a method for separating a PSF ($K_{S2}$) corresponding to a lens distortion from an extracted total PSF associated with the total distortion in the input image in accordance with an embodiment of the present disclosure.

As illustrated in FIG. 3B, the method 303 includes one or more function blocks for separating a PSF ($K_{S2}$) 137 corresponding to a lens distortion upon extracting the total PSF 135 corresponding to the total distortion in the Input image 131. The method 303 may be described in the general context of computer executable instructions, although it may also be implemented as a circuit. Generally, computer executable instructions can include routines, programs, objects, components, data structures, procedures, modules, and functions, which perform specific functions or implement specific abstract data types.

The order in which the method 303 is described shall not be construed as a limitation, and any number of the described method blocks can be combined in any order to implement the method. Additionally, individual blocks may be deleted from the method without departing from the spirit and scope of the subject matter described herein. Furthermore, the method can be implemented in any suitable hardware, software, firmware, or combination thereof.

At block $303_1$, the method may include initializing the PSF ($K_{S2}$) 137 to the pre-estimated kernel 105 ($K_P$). For example, initialization may be represented by;

$$K_{S2} = K_P \tag{EQN. 5}$$

At block $303_3$, the method may include determining an approximate kernel ($K_{delta}$) by identifying a difference between the total PSF 135 and the PSF ($K_{S2}$) 137.

At block $303_5$, the method may include minimizing each of the approximate kernel ($K_{delta}$) and the PSF ($K_{S2}$) 137 iteratively. The minimization of the approximate kernel ($K_{delta}$) and the PSF ($K_{S2}$) 137 may be performed in two steps alternatively. For example, in the first step, the approximate kernel ($K_{delta}$) may be minimized by fixing the PSF ($K_{S2}$) 137. For example, the cost function for the approximate kernel ($K_{delta}$) may be represented by;

$$F(K_{delta}) = \mathrm{argmin}\{\|K - K_{S2} * K_{delta}\|_2^2 + \lambda_4 \rho(K_{delta})\} \tag{EQN. 6}$$

In EQN. 6, $\lambda_4$ represents a tunable parameter used for putting constraints on the approximate kernel ($K_{delta}$).

In the second step, the PSF ($K_{S2}$) 137 may be minimized by fixing the approximate kernel ($K_{delta}$). For example, the cost function for the PSF ($K_{S2}$) may be represented by;

$$F(K_{S2}) = \mathrm{argmin}\{\|K - K_{S2} * K_{delta}\|_2^2 + \lambda_3 \Gamma(K_{S2})\} \tag{EQN. 7}$$

In EQN. 7, $\lambda_3$ represents a tuneable parameter used for putting constraints on the PSF ($K_{S2}$) 137.

The minimization may be continued alternatively until the difference between the approximate kernel ($K_{delta}$) and the PSF ($K_{S2}$) 137 becomes less than or equal to a predefined value associated with a convergence error. For example, the stopping criterion for the iteration may be represented by;

$$\mod(K_P - K_{S2}) \le \varepsilon \qquad \text{(EQN. 8)}$$

In EQN. 8, ε represents a convergence error.

Figure 4:
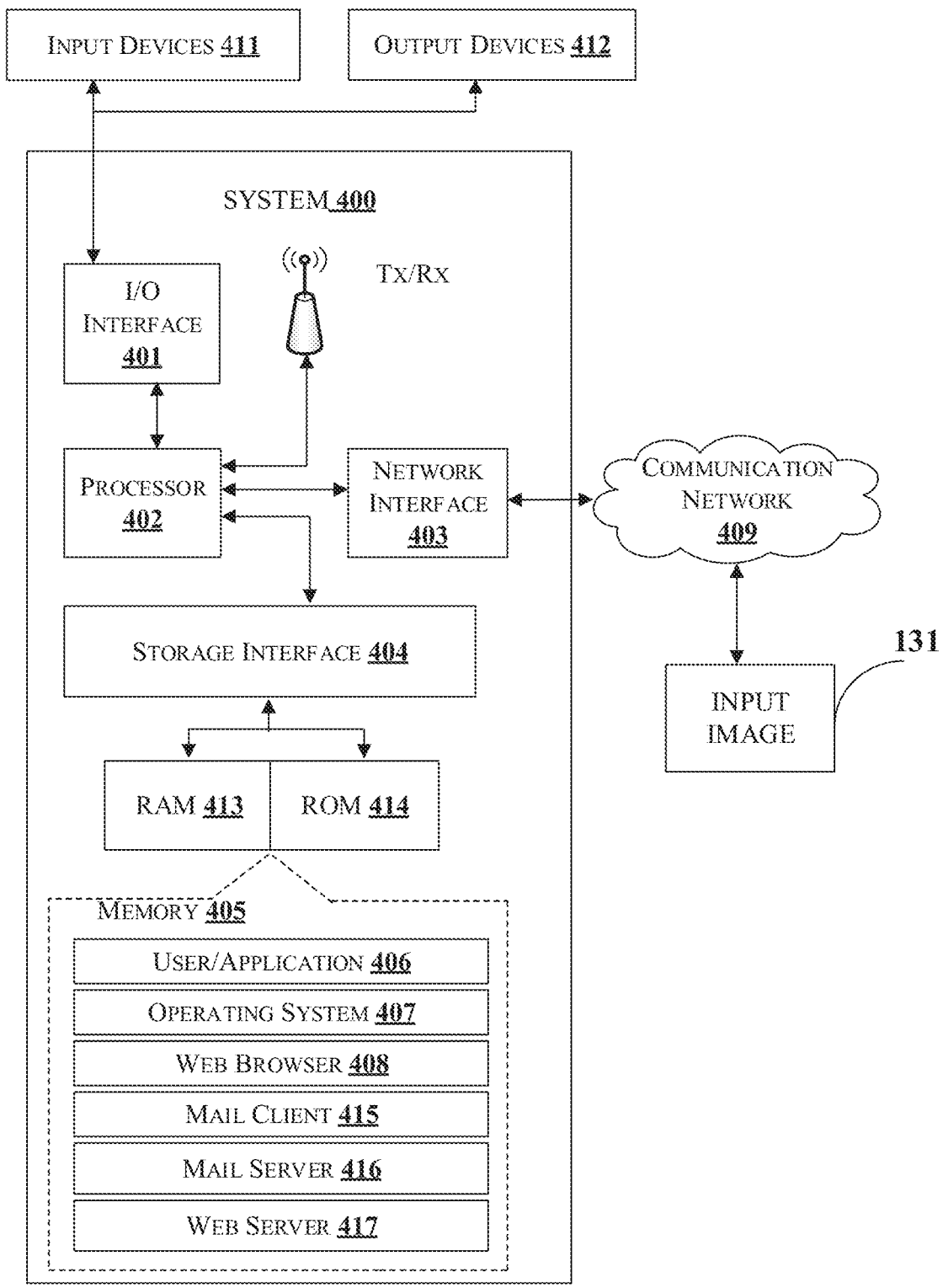
FIG. 4 is a block diagram of an exemplary computer system for implementing embodiments consistent with the present disclosure.

FIG. 4 illustrates an exemplary computer system 400 for implementing embodiments consistent with the present disclosure. In an embodiment, the computer system 400 may be a system for compensating lens distortion in an input image. The computer system 400 may include a central processing unit ("CPU" or "processor") 402. The processor 402 may comprise at least one data processor for executing program components to effect user-generated or system-generated business processes. The processor 402 may include specialized processing units such as integrated system or bus controllers, memory management control units, floating point units, graphics processing units, digital signal processing units, and the like.

The processor 402 may be disposed in communication with one or more input/output (I/O) devices (411 and/or 412) via an I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth®, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and/or 412.

In an embodiment, the processor 402 may be disposed in communication with a communications network 409 via a network interface 403. The network interface 403 may communicate with the communications network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communications network 409 can be implemented as one of the several types of networks, such as intranet or Local Area Network (LAN) or the like within the organizational structure of the system 400. The communications network 409 may either be a dedicated network or a shared network, which may represent an association of several types of networks that use a variety of protocols, such as, for example, Hypertext Transfer Protocol (HTTP), Transmission Control Protocol/Internet Protocol (TCP/IP), Wireless Application Protocol (WAP), etc., to communicate with each other. Further, the communications network 409 may include a variety of network devices, including routers, bridges, servers, computing devices, storage devices, etc.

In an embodiment, the processor 402 may be disposed in communication with a memory 405 (e.g., RAM 413, ROM 414, etc. as shown in FIG. 4) via a storage interface 404. The storage interface 404 may connect to a memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user/application 406, an operating system 407, a web browser 408, a mail client 415, a mail server 416, a web server 417 and the like. In an embodiment, the computer system 400 may store user/application data 406, such as the data, variables, records, etc. as described in this present disclosure. Such databases may be implemented as fault-tolerant, relational, scalable, and/or secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (e.g., BERKELEY SOFTWARE DISTRIBUTION™ (BSD), FREEBSD™, NETBSD™, OPENBSD™, etc.), LINUX DISTRIBUTIONS™ (e.g., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™, VISTA™/7/8, 10 etc.), Unix® X-Windows, web interface libraries (e.g., AJAX™, DHTML™, ADOBE® FLASH™ JAVASCRIPT™, JAVA™, etc.), or the like.

Furthermore, one or more computer-readable storage media may be utilized in implementing embodiments consistent with the present disclosure. A computer-readable storage medium refers to any type of tangible memory on which information or data readable by a processor may be stored. Thus, a computer-readable storage medium may store instructions for execution by one or more processors, including instructions for causing the processor or processors to perform steps or stages consistent with the embodiments described herein. The term "computer-readable medium" shall be understood to include tangible items and exclude carrier waves and transient electromagnetic signals. That is, the medium itself is non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Exemplary embodiments of the present disclosure are illustrated herein. In embodiments, the present disclosure provides methods and systems for compensating lens distortion in an image. In an embodiment, the present disclosure provides method for separating out the lens distortion from the total distortion present in the input image and may be computationally inexpensive.

In an embodiment, the present disclosure provides a method for updating a pre-estimated kernel of the imaging system with a Point Spread Function (PSF) corresponding to lens distortion present in an input image and may be computationally cost effective. Further, due to repeated updating of the pre-estimated kernel, the quality of the output image obtained from the imaging system is maintained irrespective of errors introduced by wear and tear of the lens of the imaging system over a period of time.

The terms "exemplary embodiment", "an embodiment", "embodiment", "embodiments", "the embodiment", "the embodiments", "one or more embodiments", "some embodiments", "one embodiment" or the like shall mean "at least one, but not necessarily all, embodiments of the present disclosure" unless expressly specified otherwise.

The terms "including", "comprising", "having" and variations thereof shall mean "including but not limited to", unless expressly specified otherwise. An enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary, a variety of optional components are described to illustrate the wide variety of possible embodiments of the present disclosure.

When a single device or article is described herein, it shall be understood that more than one device/article, whether or not they cooperate, may be used in place of a single device/article. Similarly, where more than one device or article is described herein, whether or not they cooperate, it shall be understood that a single device/article may be used in place of the more than one device or article or a different number of devices/articles may be used instead of the shown number of devices/articles and/or programs. The functionality and/or the features of a device may be alternatively embodied by one or more other devices which are not explicitly described as having such functionality/features. Thus, other embodiments of the present disclosure need not include the device itself.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by the claims that issue. Accordingly, the embodiments of the present disclosure are intended to be illustrative, but not limiting, of the scope of the present disclosure, which is set forth in the following claims.

While various embodiments have been disclosed herein, other embodiments may be apparent to those of ordinary skill in the pertinent art. The various embodiments disclosed herein are for purposes of illustration and are not intended to be limiting, with the true scope and spirit being indicated by the following claims.

We claim:

1. A method of compensating for lens distortions in an input image, the method comprising:
    identifying a lens distortion from among one or more distortions in the input image received through a camera lens;
    extracting a Point Spread Function (PSF) corresponding to the identified lens distortion;
    identifying one or more singular values and a rank for the extracted PSF by performing Singular Value Decomposition (SVD) on the extracted PSF;
    comparing the rank of the extracted PSF with a predefined rank value of a pre-estimated kernel stored in a memory;
    determining one or more difference values between the one or more singular values of the extracted PSF and one or more singular values of the pre-estimated kernel stored in the memory when the rank of the extracted PSF matches the predefined rank value of the pre-estimated kernel stored in the memory; and
    updating the pre-estimated kernel with the extracted PSF to compensate the identified lens distortion when each of the determined one or more difference values is within a pre-defined threshold limit stored in the memory.

2. The method as claimed in claim 1, wherein the lens distortion is identified by deep learning-based classification.

3. The method as claimed in claim 1, wherein the PSF corresponding to the identified lens distortion is extracted using a blind deconvolution technique.

4. The method as claimed in claim 1 further comprising:
    extracting a total PSF associated with total distortion present in the input image;
    separating a PSF corresponding to a lens distortion from the extracted total PSF associated with the total distortion in the Input image;
    identifying one or more singular values and a rank for the separated PSF by performing SVD on the separated PSF;
    comparing the rank of the separated PSF with a predefined rank value of a pre-estimated kernel stored in a memory;
    determining one or more difference values between the one or more singular values of the separated PSF and one or more singular values of the pre-estimated kernel stored in the memory when the rank of the separated PSF matches with the predefined rank value of the pre-estimated kernel stored in the memory; and
    updating the pre-estimated kernel with the separated PSF to compensate the lens distortion when each of the determined one or more difference values is within a pre-defined threshold limit stored in the memory.

5. The method as claimed in claim 4, wherein the total PSF is extracted using blind deconvolution technique.

6. The method as claimed in claim 4, wherein separating the PSF corresponding to the lens distortion comprises:
    initializing the PSF to the pre-estimated kernel;
    determining an approximate kernel by identifying difference between the total PSF and the PSF; and
    minimizing each of the approximate kernel and the PSF iteratively until difference between the approximate kernel and the PSF is less than or equal to a predefined value associated with a convergence error.

7. An imaging system comprising:
    a processor; and
    a memory communicatively coupled to the processor, wherein the memory stores the processor-executable instructions, which, on execution, cause the processor to:
    identify a lens distortion in an image among one or more distortions in the image;
    extract a Point Spread Function (PSF) corresponding to the identified lens distortion;
    identify one or more singular values and a rank for the extracted PSF by performing Singular Value Decomposition (SVD) on the extracted PSF;
    compare the rank of the extracted PSF with a predefined rank value of a pre-estimated kernel stored in a memory of the imaging system;
    determine one or more difference values between the one or more singular values of the extracted PSF and one or more singular values of the pre-estimated kernel stored in the memory when the rank of the extracted PSF matches with the predefined rank value of the pre-estimated kernel stored in the memory; and update the pre-estimated kernel of the imaging system with the extracted PSF to compensate the lens distortion when each of the determined one or more difference values is within a pre-defined threshold limit stored in the memory.

8. The imaging system as claimed in claim 7, wherein the processor identifies the lens distortion by deep learning-based classification.

9. The imaging system as claimed in claim 7, wherein the processor extracts the PSF corresponding to the identified lens distortion by blind deconvolution technique.

10. The imaging system as claimed in claim 7, wherein the processor-executable instructions, which, on execution, cause the processor to extract the PSF corresponding to the identified lens distortion comprise processor-executable instructions, which, on execution, cause the processor to:

acquire a total PSF associated with a total distortion present in the input image; and separate a PSF corresponding to a lens distortion from the acquired total PSF associated with the total distortion present in the input image, wherein the extracted PSF is the separated PSF.

11. The imaging system as claimed in claim 10, wherein the processor acquires the total PSF using blind deconvolution technique.

12. The imaging system as claimed in claim 10, wherein the processor separates the PSF corresponding to the lens distortion by:

initializing the PSF to the pre-estimated kernel;

determining an approximate kernel by identifying a difference between the total PSF and the separated PSF; and minimizing each of the approximate kernel and the separated PSF iteratively until a difference between the approximate kernel and the separated PSF is less than or equal to a predefined value associated with convergence error.

13. An image de-blurring apparatus comprising:

a camera having a lens;

a processor;

a memory communicatively coupled between the camera and the processor, including an estimated kernel register configured to store a pre-estimated kernel, a rank value register configured to store a pre-defined rank value of the pre-estimated kernel, and a threshold limit register configured to store a pre-defined threshold limit;

a de-blurring module communicatively coupled to the camera and the estimated kernel register and configured to provide an image de-blurring compensation factor responsive to a blurring distortion of the lens;

a Point Spread Function (PSF) estimation module communicatively coupled to the camera and configured to provide a separated PSF; and a PSF updating module communicatively coupled between the PSF estimation module and the estimated kernel register, wherein the image de-blurring apparatus is configured to determine one or more difference values between one or more values of the separated PSF and one or more singular values of the ore-estimated kernel when a rank of the separated PSF matches the pre-defined rank value of the pre-estimated kernel, wherein the PSF updating module is configured to update the pre-estimated kernel with the separated PSF corresponding to the image de-blurring compensation factor to compensate the blurring distortion of the lens when each of the determined one or more difference value is within the pre-defined threshold limit.

14. The image de-blurring apparatus as claimed in claim 13, further comprising:

a PSF separation module communicatively coupled between the PSF estimation module and the PSF updating module.

15. The image de-blurring apparatus as claimed in claim 13, further comprising:

a distortion classification module including communicatively coupled between the camera and the PSF estimation module.

16. The image de-blurring apparatus as claimed in claim 13, wherein the PSF updating module is communicatively coupled between the rank value register and the estimated kernel register.

17. The image de-blurring apparatus as claimed in claim 13, wherein the PSF updating module is communicatively coupled between the threshold limit register and the estimated kernel register.

18. The image de-blurring apparatus as claimed in claim 13, further comprising:

a Singular Value Decomposition (SVD) module communicatively coupled between the PSF estimation module and the rank value register.

19. The image de-blurring apparatus as claimed in claim 13, further comprising:

a Singular Value Decomposition (SVD) module communicatively coupled between the PSF estimation module and the PSF updating module.

20. The image de-blurring apparatus as claimed in claim 13, further comprising:

an output image buffer communicatively coupled to the de-blurring module.

* * * * *